United States Patent
Roeland et al.

(10) Patent No.: US 10,932,151 B2
(45) Date of Patent: Feb. 23, 2021

(54) DISTINGUISHING ICN FROM NON-ICN TRAFFIC IN A MOBILE NETWORK

(71) Applicant: TELEFONAKTIEBOLAGET LM ERICSSON (PUBL), Stockholm (SE)

(72) Inventors: Dinand Roeland, Sollentuna (SE); Hans Eriksson, Sollentuna (SE); Kim Laraqui, Solna (SE); Neiva Lindqvist, Stockholm (SE); Gunnar Mildh, Sollentuna (SE); Ala Nazari, Handen (SE); Börje Ohlman, Bromma (SE); Patrik Sellstedt, Sollentuna (SE); Ioanna Pappa, Stockholm (SE); Johan Rune, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 83 days.

(21) Appl. No.: 16/306,022

(22) PCT Filed: May 31, 2016

(86) PCT No.: PCT/SE2016/050511
§ 371 (c)(1),
(2) Date: Nov. 30, 2018

(87) PCT Pub. No.: WO2017/209668
PCT Pub. Date: Dec. 7, 2017

(65) Prior Publication Data
US 2019/0223045 A1   Jul. 18, 2019

(51) Int. Cl.
*H04W 28/02* (2009.01)
*H04W 76/10* (2018.01)
(Continued)

(52) U.S. Cl.
CPC ......... *H04W 28/0215* (2013.01); *H04L 67/12* (2013.01); *H04W 8/24* (2013.01);
(Continued)

(58) Field of Classification Search
CPC .. H04L 67/12; H04W 28/0215; H04W 76/10; H04W 8/24
See application file for complete search history.

(56) References Cited

U.S. PATENT DOCUMENTS

2017/0034055 A1 * 2/2017 Ravindran ............ H04L 45/306
2017/0134253 A1 * 5/2017 Wang .................. H04L 67/1097
(Continued)

FOREIGN PATENT DOCUMENTS

WO   2016053159 A1   4/2016

OTHER PUBLICATIONS

Taleb, et al., Follow Me Cloud: Interworking Federated Clouds and Distributed Mobile Networks, IEEE Network, p. 12-19, Sep./Oct. 2013.
(Continued)

*Primary Examiner* — Gbemileke J Onamuti
(74) *Attorney, Agent, or Firm* — Sage Patent Group (57) ABSTRACT

The invention relates to methods, a wireless communication device and a network node for enabling establishment of at least one Packet Data Network (PDN) connection between a wireless communication device and a communication network.

In a first aspect of the invention, a method performed by a wireless communication device of enabling establishment of at least one Packet Data Network (PDN) connection—with a communication network is provided. The method comprises submitting, to a node of the communication network, a request to establish the PDN connection, the request being configured to comprise an indication that the request pertains to establishing a PDN connection for transporting Information Centric Networking (ICN) data.

17 Claims, 9 Drawing Sheets

(51) Int. Cl.
   *H04W 8/24*     (2009.01)
   *H04L 29/08*    (2006.01)
   *H04W 76/12*    (2018.01)
(52) U.S. Cl.
   CPC .......... *H04W 76/10* (2018.02); *H04L 67/327* (2013.01); *H04W 76/12* (2018.02)

(56) References Cited

U.S. PATENT DOCUMENTS

2017/0237660 A1* 8/2017 Trossen .................. H04L 67/12
                                                              370/392
2018/0227390 A1* 8/2018 Reznik ................ H04L 67/2842

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access (Release 13), 3GPP TS 23.401 V13.6.1, Mar. 2016.

Karimzadeh, et al., Utilizing ICN/CCN for service and VM migration support in virtualized LTE systems, Apr. 3, 2014.

3rd Generation Partnership Project; Technical Specification Group Services and System Aspects; Feasibility Study on New Services and Markets Technology Enablers; Stage 1 (Release 14), 3GPP TR 22.891 V14.0.0, Mar. 2016.

* cited by examiner

DISTINGUISHING ICN FROM NON-ICN TRAFFIC IN A MOBILE NETWORK

This application is a 371 of International Application No. PCT/SE2016/050511, filed May 31, 2016, the disclosure of which is fully incorporated herein by reference.

TECHNICAL FIELD

The invention relates to methods, a wireless communication device and a network node for enabling establishment of at least one Packet Data Network (PDN) connection between a wireless communication device and a communication network.

Moreover, the invention relates to computer programs comprising computer-executable instructions for causing the wireless communication device and the network node, respectfully, to perform steps of the methods according to embodiments, when the computer-executable instructions are executed on a respective processing unit included in the wireless communication device and the network node.

The invention further relates to computer program products comprising computer readable mediums, the computer readable mediums having the computer programs of the wireless communication device and the network node, respectively, embodied thereon.

BACKGROUND

Over recent years, Information/Content Centric Networking (ICN/CCN) is gaining momentum as a future technology for 5th generation mobile networks ("5G") and other coming technologies for media distribution, device software upgrades and the Internet of Things (IoT).

Information Centric Networking and Content Centric Networking are sometimes also referred to as Named Data Networking (NDN). In the following, the term ICN will be used to encompass ICN, CCN and NDN technology.

ICN may be utilized for delivery of content to a wireless communications device, commonly referred to as a User Equipment (UE), over e.g. a 3rd Generation Partnership Project (3GPP) network, where the UE may be embodied in the form a smart phone, tablet, laptop, a gaming console, etc., or a so called fixed wireless terminal (FWT) in the form of e.g. a television set, a computer, or a set top box.

In contrast to traditional Internet Protocols (IPs), ICN addresses content objects using globally unique names instead of IP addresses.

Figure 1:
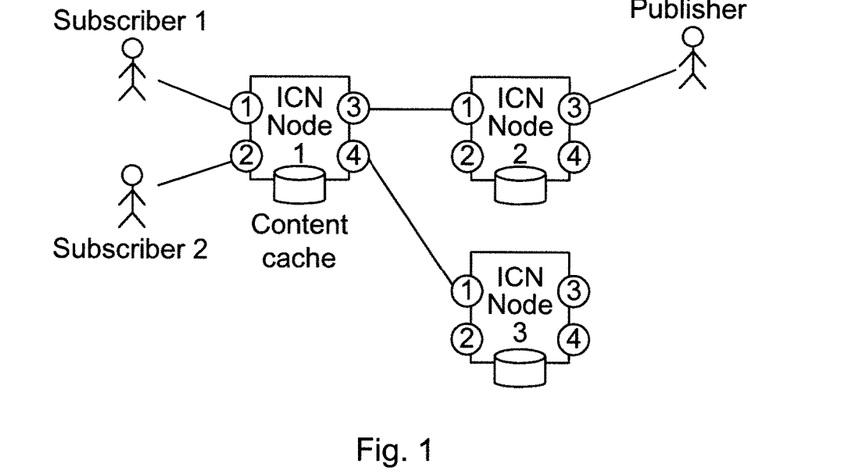
FIG. 1 illustrates an ICN-type network.

FIG. 1 illustrates a general operating principle of prior art ICN content request and delivery. This operating principle assumes that a link used in one direction—e.g. between ICN Node 1 and ICN Node 2 essentially being switches equipped with large caches for transporting content—to send content requests from subscribers is also used in the other direction to send the corresponding content back via ICN Node 1 and ICN Node 2 from a content provider to the subscribers. All links in ICN are therefore assumed to allow for bi-directional communication. A request in ICN terminology is commonly referred to as an "interest".

Multicast support is a key feature in ICN when transporting a particular content from a content provider to various subscribers/end users whom have requested content from that particular content provider. Whenever a node which has received content requests from several subscribers over different interfaces (each node being illustrated to comprise four interfaces in FIG. 1) receives requested content available for delivery, the node will deliver the requested content to the subscribers over a respective interface.

With reference to FIG. 1, if both Subscriber 1 and 2 request the same content, e.g. a live video stream, both subscribers will submit a request/interest to ICN Node 1. However, ICN Node 1 will only forward a single request to ICN Node 2 for that video stream, and ICN Node 2 will as a result forward the single request towards the content provider. The content provider will thereafter return a single copy of the requested live stream to ICN Node 2. Likewise, ICN Node 2 will only send one copy of the live stream over its link to ICN Node 1. ICN Node 1 will then replicate the content of the video stream and send it to both Subscriber 1 and 2.

To the contrary, should ICN node 1 already have the requested content in its cache, it will deliver the content to the requesting subscriber(s) without submitting any further upstream request to ICN Node 2.

The routing of interests is helped by the name of a requested piece of content being a structured name (similar to domain names, but with richer syntax). Routing ICN nodes maintain a Forwarding Information Base (FIB) about where, i.e. across which interface, the name or name prefix should be forwarded. The routing ICN nodes along the path of the travelling interest message keep a record of the interest messages they have forwarded (the interface it came from and the content object it was naming) in their Pending Interest Table (PIT).

As can be concluded, when the interest message reaches an ICN node having a copy of the content object, the content object is propagated backwards along the path the interest message took. The backward path is learned from the entries the interest message left in the PIT of the ICN nodes along the path. If there were multiple interests arriving at an ICN node for a content object address by a particular name, the content object is replicated towards each respective interface/direction the interest messages came from. After forwarding a content object matching a pending interest, the ICN nodes delete the corresponding entry in the PIT. When the original endpoint(s) generating the interest message(s) receive the content object, the transaction is considered finalized.

If other interest messages addressing the same content object arrive at a routing ICN node, it does not forward them, just notes them in the PIT along the entry for the named content object, which is referred to as interest aggregation. This way the PIT entries for the same name (i.e. the same content object) may form a tree in the network with receiver of the interests as the leaves. Interest aggregation is particular advantageous in case of a flash crowd event where suddenly thousands of endpoints are requesting the same content, since the source will only be reached by one request for the content, all other requests will be served from the caches of routers along the path towards the source.

As can be concluded ICN technology provides for an efficient, scalable and flexible approach of delivering information to an end-user.

A problem with implementing ICN technology in wireless communication networks is that there is no way to differentiate ICN traffic from other types of traffic, such as e.g. IP traffic.

SUMMARY

An object of the present invention is to solve, or at least mitigate, this problem in the art and thus to provide an improved method of enabling establishment of a Packet Data Network (PDN) connection with a communication network for a wireless communication device.

This object is attained in a first aspect of the invention by a method performed by a wireless communication device of enabling establishment of at least one Packet Data Network (PDN) connection with a communication network. The method comprises submitting, to a node of the communication network, a request to establish the PDN connection, the request being configured to comprise an indication that the request pertains to establishing a PDN connection for transporting Information Centric Networking (ICN) data.

This object is attained in a second aspect of the invention by a wireless communication device configured to enable establishment of at least one PDN connection with a communication network. The wireless communication device comprises a processing unit and a memory, said memory containing instructions executable by said processing unit, whereby said wireless communication device is operative to submit, to a node of the communication network, a request to establish the PDN connection, the request being configured to comprise an indication that the request pertains to establishing a PDN connection for transporting ICN data.

This object is attained in a third aspect of the invention by a method performed by a node in a communication network of enabling establishment of at least one PDN connection with a wireless communication device. The method comprises receiving, from the wireless communication device, a request to establish the PDN connection, the request being configured to comprise an indication that the request pertains to establishing a PDN connection for transporting ICN data.

This object is attained in a fourth aspect of the invention by a node configured to enable establishment of at least one PDN, connection with a wireless communication device in a communication network. The node comprises a processing unit and a memory, said memory containing instructions executable by said processing unit, whereby said node (13) is operative to receive, from the wireless communication device, a request to establish the PDN connection, the request being configured to comprise an indication that the request pertains to establishing a PDN connection for transporting ICN data.

This object is attained in a fifth aspect of the invention by a method performed by a node in a communication network of enabling establishment of at least one PDN connection with a wireless communication device. The method comprises acquiring an indication whether the wireless communication device is capable of establishing a PDN connection for transporting ICN data.

This object is attained in a sixth aspect of the invention by a node configured to enable establishment of at least one PDN connection with a wireless communication device in a communication network. The node comprises a processing unit and a memory, said memory containing instructions executable by said processing unit, whereby said node is operative to acquire an indication whether the wireless communication device is capable of establishing a PDN connection for transporting ICN data.

In a scenario where e.g. a wireless communication device such as a UE is connected by means of a first PDN connection 20 to a first PDN, for instance the Internet, via a first PGW and wishes to establish a further PDN connection 21 to a second PDN, referred to as an ICN PDN, via a second PGW 22, it is necessary that the network is capable of distinguish the ICN PDN request from a "regular" PDN request of an IPv4, IPv4v6 ("dual stack") or IPv6 PDN type.

To this end, the UE will, upon submitting a request to a Mobility Management Entity (MME) effectively managing the PDN connection setup via an eNodeB to have the ICN PDN connection established, configure the request to comprise an indication—such as a designated Information Element (IE); either an already available IE or a new IE—that the request pertains to establishing a PDN connection for transporting ICN data.

Advantageously, the MME will accordingly effect establishment of the second PDN connection—i.e. a designated ICN PDN connection—with an ICN gateway for UE access to the ICN PDN. Thus, by having the UE configure the request with an indication that the request pertains to a request for connection to an ICN network, the MME is able to distinguish a request for setting up the ICN PDN connection from a request to set up the regular PDN connection.

Is it noted that the setting up of the ICN PDN connection alternatively may be initiated by a network node, such as the MME.

In an embodiment, the network notifies the wireless communication device about its capability to provide ICN services; that is, whether the network at all is capable of setting up a PDN connection to an ICN network. Hence, a network node, e.g. the MME, advantageously submits a message via the eNodeB to the wireless communication device informing that the network indeed is ICN capable.

In an embodiment, the indication as to whether the network is ICN capable is advantageously provided to the wireless communication device upon configuration, for instance included with a Subscriber Identity Module (SIM) inserted in the wireless communication device.

In another embodiment, the wireless communication device acquires information identifying at least one ICN node with which the PDN connection is established for transporting ICN data.

In yet another embodiment, the wireless communication device receives, in response to a submitted request for an ICN PDN connection, a message indicating an ICN gateway node in the communication network selected by a node in the network such as the MME or the eNodeB, wherein the PDN connection for transporting ICN data can be established with the indicated ICN gateway node.

Further provided is a computer program comprising computer-executable instructions for causing the wireless communication device to perform steps according to an embodiment of the first aspect of the invention, when the computer-executable instructions are executed on a processing unit included in the wireless communication device.

Further provided is a computer program product comprising a computer readable medium, the computer readable medium having the computer program of the wireless communication device embodied thereon.

Still further provided is a computer program comprising computer-executable instructions for causing the network node to perform steps according to an embodiment of the third and fifth aspects of the invention, when the computer-executable instructions are executed on a processing unit included in the node.

Yet further provided is a computer program product comprising a computer readable medium, the computer readable medium having the computer program of the network node embodied thereon.

These and further embodiments of the invention will be discussed in more detail in the detailed description in the following with reference made to the accompanying drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 shows an ICN-type network, the general principles of which previously have been discussed.

Figure 2:
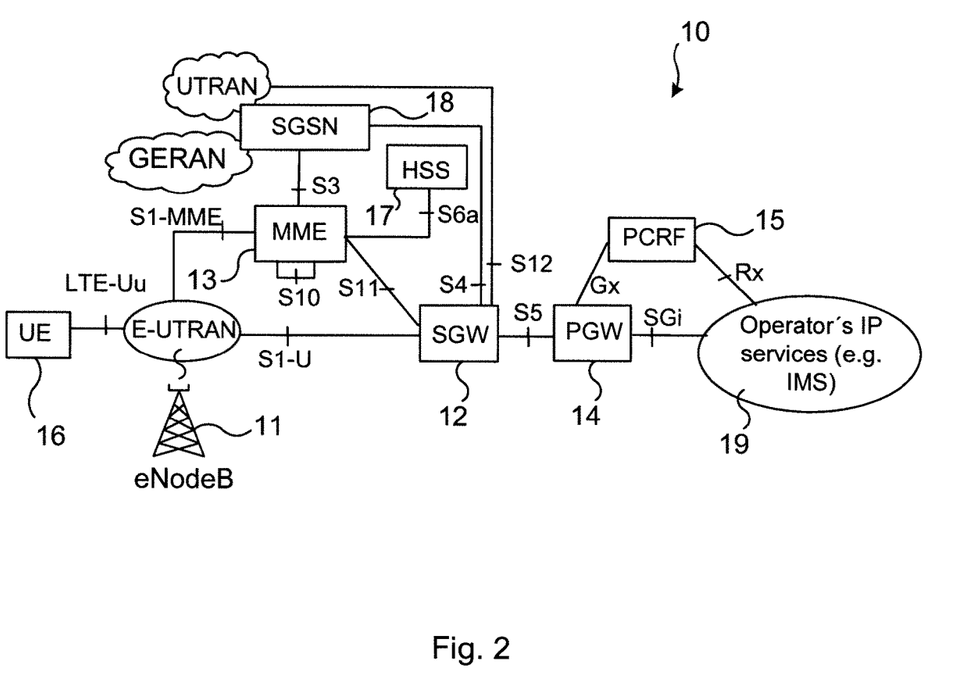
FIG. 2 shows a schematic overview of an exemplifying wireless communication system in which embodiments of the present invention may be implemented.

FIG. 2 shows a schematic overview of an exemplifying wireless communication system 10 in which embodiments of the present invention may be implemented. The wireless communication system 10 is an Long Term Evolution (LTE) based system. It should be pointed out that the terms "LTE" and "LTE based" system is here used to comprise both present and future LTE based systems, such as, for example, advanced LTE systems. It should be appreciated that although FIG. 1 shows a wireless communication system 10 in the form of an LTE based system, the example embodiments herein may also be utilized in connection with other wireless communication systems, such as e.g. Global System for Mobile Communications (GSM) or Universal Mobile Telecommunications System (UMTS), comprising nodes and functions that correspond to the nodes and functions of the system in FIG. 1.

The wireless communication system 10 comprises a base station in the form of an eNodeB 11, operatively connected to a Mobility Management Entity (MME) 13 and to a Serving Gateway (SGW) 12, in turn operatively connected to the MME 13, and a Packet Data Network Gateway (PGW) 14, which in turn is operatively connected to a PCRF 15. The eNodeB 11 is a radio access node that interfaces with a mobile radio terminal, commonly referred to as a User Equipment (UE) 16 in the form of e.g. smart phone, tablet, laptop, gaming console, etc.

The PGW 14 provides connectivity to the UEs to external Packet Data Networks (PDNs) 19 by being the point of exit and entry of traffic for the UE with respect to the PDNs. A UE may have simultaneous connectivity with more than one PGW for accessing multiple PDNs, or multiple connections to a single PGW for accessing multiple PDNs.

The eNodeB(s) of the system form the Evolved Universal Terrestrial Radio Access Network (E-UTRAN) for LTE communicating with the UE over an air interface such as LTE-Uu. The core network in LTE is known as EPC, and the EPC together with the E-UTRAN is referred to in LTE as the EPS. The SGW 12 routes and forwards user data packets over the S1-U interface, whilst also acting as the mobility anchor for the user plane during inter-eNodeB handovers and as the anchor for mobility between LTE and other 3GPP technologies (terminating S4 interface and relaying the traffic between 2G/3G systems and the PGW 14). For idle state UEs, the SGW 12 terminates the downlink (DL) data path and triggers paging when DL data arrives for the UE 16, and further manages and stores UE contexts, e.g. parameters of the IP bearer service, network internal routing information. It also performs replication of the user traffic in case of lawful interception. The SGW 12 communicates with the MME 13 via interface S11 and with the PGW 14 via the S5 interface. Further, the SGW 12 may communicate with the UMTS radio access network Universal Terrestrial Radio Access Network (UTRAN) and with the GSM EDGE ("Enhanced Data rates for GSM Evolution") Radio Access Network (GERAN) via the S12 interface.

The MME 13 is responsible for idle mode UE tracking and paging procedure including retransmissions. It is involved in the bearer activation/deactivation process and is also responsible for choosing the SGW 12 for a UE 16 at the initial attach and at time of intra-LTE handover involving core network node relocation. It is responsible for authenticating the user by interacting with the Home Subscriber Server (HSS) 17. The Non-Access Stratum (NAS) signaling terminates at the MME 13 and it is also responsible for generation and allocation of temporary identities to UEs via the S1-MME interface. It checks the authorization of the UE 16 to camp on the service provider's Public Land Mobile Network (PLMN) and enforces UE roaming restrictions. The MME 13 is the termination point in the network for ciphering/integrity protection for NAS signaling and handles the security key management. Lawful interception of signaling is also supported by the MME. The MME 13 also provides the control plane function for mobility between LTE and 2G/3G access networks with the S3 interface terminating at the MME 13 from a Serving GPRS ("General Packet Radio Service") Support Node (SGSN) 18. The MME 13 also terminates the S6a interface towards the home HSS 17 for roaming UEs. Further, there is an interface S10 configured for communication between MMEs for MME relocation and MME-to-MME information transfer.

The PGW 14 provides connectivity to the UE 16 to external PDNs 19 by being the point of exit and entry of traffic for the UE 16. The PGW 14 performs policy enforcement, packet filtering for each user, charging support, lawful interception and packet screening. Another key role of the PGW 14 is to act as the anchor for mobility between 3GPP and non-3GPP technologies such as WiMAX and 3GPP2 (CDMA 1x and EvDO), and also for handover involving core network node relocation. The interface between the PGW 14 and the packet data network is referred to as the SGi. The packet data network may be an operator external public or private packet data network or an intra operator packet data network, e.g. for provision of IP Multimedia Subsystem (IMS) services.

The PCRF 15 determines policy rules in real-time with respect to the radio terminals of the system. This may e.g. include aggregating information in real-time to and from the core network and operational support systems, etc. of the system so as to support the creation of rules and/or automatically making policy decisions for user radio terminals currently active in the system based on such rules or similar. The PCRF 15 provides the PGW 14 with such rules and/or policies or similar to be used by the PGW acting as a Policy and Charging Enforcement Function (PCEF) 20 via interface Gx. The PCRF further communicates with the packet data network via the Rx interface.

Figure 3:
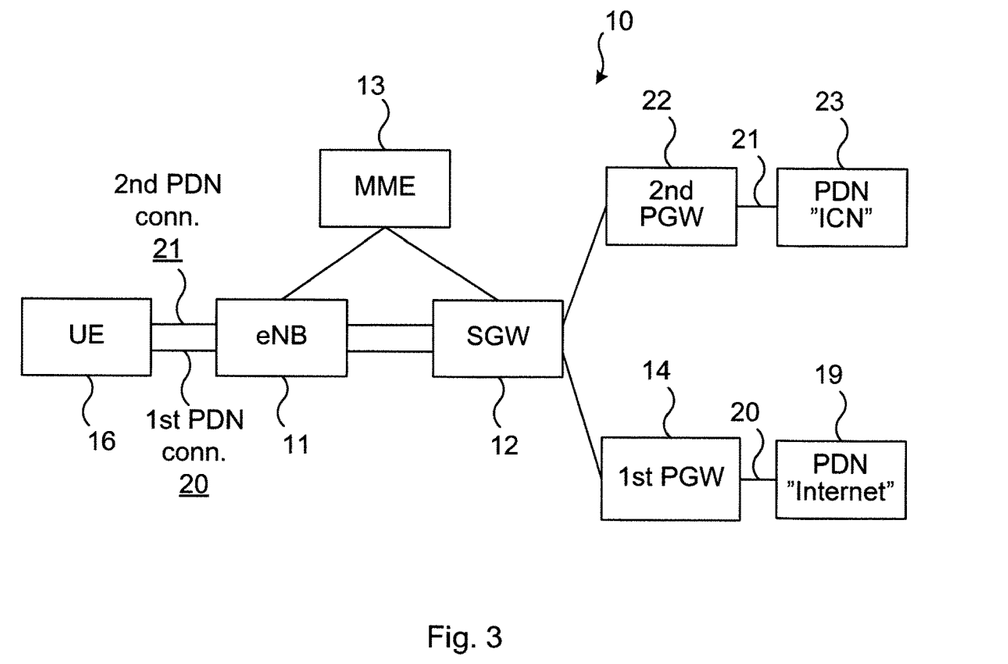
FIG. 3 illustrates a communication network where an embodiment is implemented for establishing a PDN connection between a UE and an ICN PDN.

FIG. 3 illustrates a communication network 10 in the form of a simplified LTE network, discussed in more detail with reference to FIG. 2, where an embodiment is implemented for establishing a PDN connection between a UE 16 and a PDN 23 being an ICN-type network.

Assuming that the UE 16 is connected by means of a first PDN connection 20 to a first PDN 19, e.g. the Internet, via a first PGW 14 and wishes to establish a further PDN connection 21 to a second PDN 23, referred to as an "ICN PDN", via a second PGW 22, it is necessary that the network 10 is capable of distinguish the ICN PDN request from a "regular" PDN request of an IPv4, IPv4v6 (commonly referred to as "dual stack") or IPv6 PDN type.

To this end, the UE 16 will, upon submitting a request to MME 13 (effectively managing the PDN connection setup) via the eNodeB 11 to have the ICN PDN connection 21 established, configure the request to comprise a designated Information Element (IE), either an already available IE or a new IE, indicating that the request pertains to establishing a PDN connection for transporting ICN data.

Advantageously, the MME 13 will accordingly effect establishment of the second PDN connection 21—i.e. a designated ICN PDN connection—with the second PGW 22 for UE access to the ICN-type PDN 23. Thus, by having the UE 16 configure the request with an ICN IE, the MME 13 is able to distinguish a request for setting up the ICN PDN connection 21 from a request to set up the regular PDN connection 20.

It is noted that a single PGW could handle both the first PDN connection 20 and the second ICN PDN connection 21 towards the PDN 19 and the ICN PDN 23, respectively.

Figure 4:
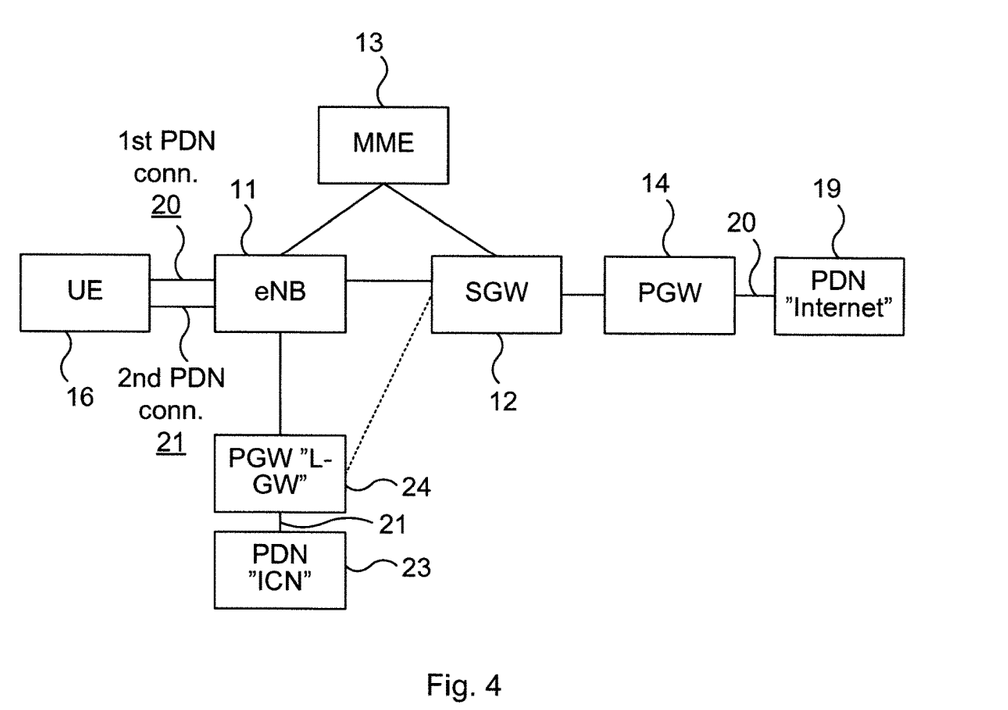
FIG. 4 illustrates an alternative communication network where another embodiment is implemented for establishing a PDN connection between a UE and an ICN PDN.

FIG. 4 illustrates an alternative communication network 100 in the form of a simplified LTE network, where another embodiment is implemented, again for establishing a PDN connection between a UE 16 and a PDN 23 being an ICN-type network. In this alternative network 100, the eNodeB 11 is connected to, or even collocated with, a gateway referred to in this embodiment as a Local Gateway (L-GW) 24.

In this configuration, the S5 interface between the LGW 24 and the SGW 14 is only used for control plane traffic, while user plane traffic normally is routed via a direct tunnel between the eNodeB 11 and the LGW 24 where data packets can shortcut without passing via the SGW 12. When the UE 16 is idle, the LGW 24 sends a first downlink user plane packet via S5 to the SGW 12 in order to trigger paging and eventually an idle-to-connected mode transition.

As can be seen, in this configuration, the UE 16 connects to the ICN-type PDN 23 via the LGW 24 acting as a PGW.

Again, assuming that the UE 16 is connected by means of a first PDN connection 20 to a first PDN 19, e.g. the Internet, via a PGW 14 and wishes to establish a further PDN connection 21 to a second ICN PDN 23 via the LGW 24, it is necessary that the network 100 is capable of distinguish the ICN PDN request from a regular PDN request.

To this end, the UE 16 will, upon submitting a request to MME 13 via the eNodeB 11 to have the ICN PDN connection 21 established, configure the request to comprise a designated IE, indicating that the request pertains to establishing a PDN connection for transporting ICN data.

Advantageously, the MME 13 will accordingly effect establishment of the ICN PDN connection 21 with the LGW 24 for UE access to the PDN-type ICN 23. Thus, by having the UE 16 configure the request with an IE indicating ICN, the MME 13 is able to distinguish a request for setting up the ICN PDN connection 21 from a request to set up the regular PDN connection 20.

In an embodiment, the network 10 (or 100) notifies the UE 16 about its capability to provide ICN services; that is, whether the network 10 at all is capable of setting up a PDN connection to an ICN network. Hence, a network node, e.g. the MME 13, advantageously submits a message via the eNodeB 11 to the UE 16 informing that the network 10 indeed is ICN capable.

This network ICN indication can be transferred as part of Radio Resource Control (RRC) signalling, either as broadcasted or unicasted system information) or NAS signalling during initial connection setup with the network 10 or it can be transferred during RRC or NAS signalling at handover of the UE 16 to the network 10, or during a paging process for having the UE 16 exit an IDLE mode. It is further envisaged in an embodiment that the network ICN indication advantageously is provided to the UE 16 upon configuration, for instance included with a Subscriber Identity Module (SIM) inserted in the UE 16.

In yet an embodiment, information identifying an ICN node with which a PDN connection is established for transporting ICN data is acquired by the UE.

Figure 5:
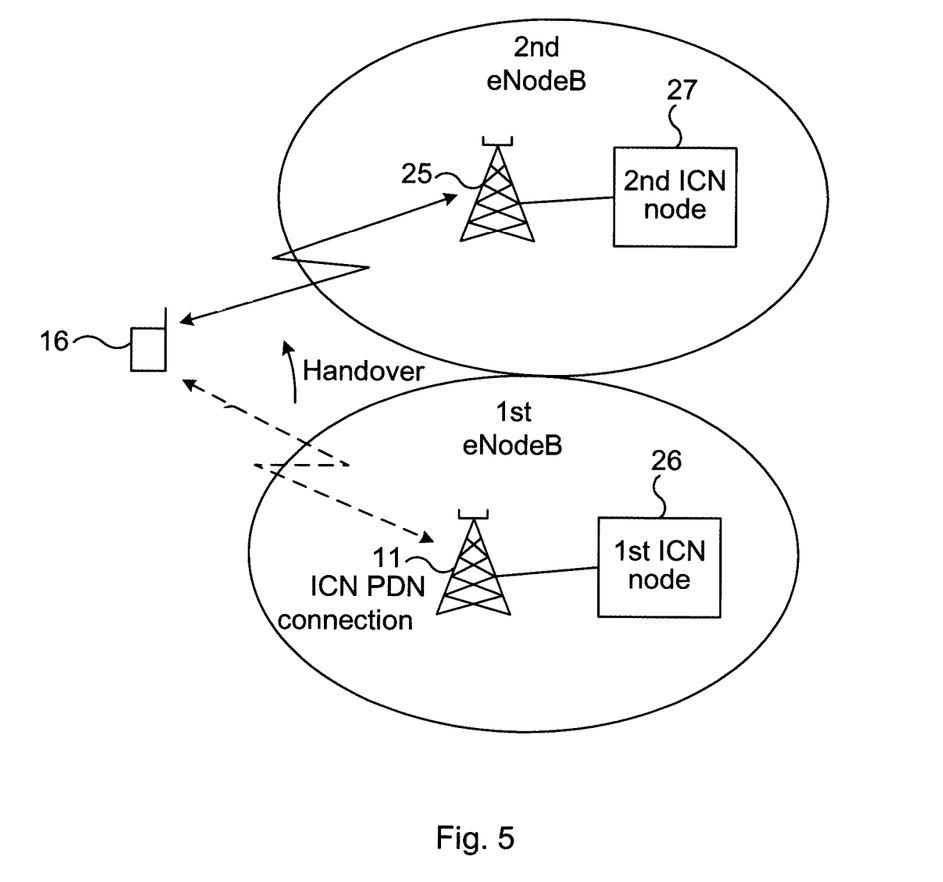
FIG. 5 illustrates a communication network where an embodiment is implemented at handover of a UE.

Reference is made to FIG. 5 illustrating a scenario where this embodiment is advantageous, in which it is assumed that the UE 16 has established a PDN connection with a first eNodeB 11 for receiving requested ICN data from a $1^{st}$ ICN node.

Now, if the UE 16 enters a new coverage area, the PDN connection is handed over to a second eNodeB 25 in order to receive the requested (and any subsequently requested) ICN data from a $2^{nd}$ ICN node 27.

By providing the UE 16 with the identity of any ICN node 26, 27 with which it is (or is to be) connected, the UE is for instance made aware that a new ICN node 27 is available for serving the UE with any ICN content. Typically, a network node such as the previously discussed MME (not shown in FIG. 5) supplies the identifier of the ICN node 27 via the serving eNodeB 25 using any appropriate method, e.g. NAS, RRC, or broadcast signalling.

For user plane traffic, all standard procedures are followed to keep ICN distinguished from other traffic. In particular, each PDN connection would have at least one bearer. Such a bearer spans all the way from the UE 16 to the PGWs 14, 16 or the LGW 24, depending on the available network architecture.

Figure 6:
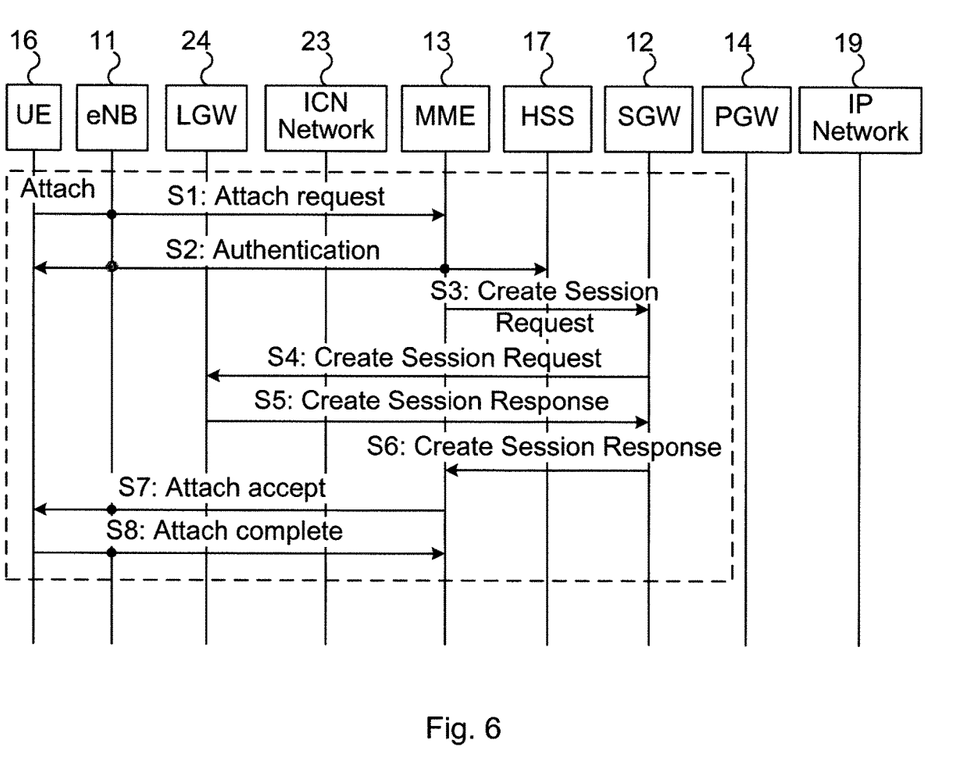
FIG. 6 illustrates a sequence diagram according to an embodiment, showing how an ICN PDN connection is setup.

FIG. 6 illustrates a sequence diagram according to an embodiment, showing how an ICN PDN connection is setup. In this exemplifying embodiment, the ICN PDN connection is set up as part of an initial attach procedure (described for instance in FIG. 5.3.2.1-1 of 3GPP TS 23.401).

In this particular exemplifying embodiment, the UE 16 is connect to an ICN PDN network 23 via an LGW 24 as shown in FIG. 4, but the sequence diagram is equally applicable to the architecture of FIG. 3, where the UE 16 is connected to the ICN PDN 23 via the $2^{nd}$ PGW 22.

In step S1, the UE 16 initiates establishment of a PDN connection with the network 10 by submitting an Attach Request to the MME 13 via the eNodeB 11, which Attach Request comprises an IE indicating that the request pertains to establishing a PDN connection for transporting ICN data, i.e. to establish a connection with an ICN-type network 23. Hence, the request for setting up an ICN PDN connection is advantageously distinguished from a regular PDN connection request.

Upon receiving the Attach Request, the MME 13 optionally performs an authentication procedure S2 (typically consisting of a number of messages being exchanged) with the UE 16 and the HSS 17, for instance by verifying that an IMSI of the UE 16 is registered with the HSS 17. Further, as previously discussed, the MME 13 may advantageously submit a message via the eNodeB 11 to the UE 16 informing that the network 10 indeed is ICN capable already in step S2 to avoid any further signalling in case the network 10 is not ICN enabled and consequently cannot setup an ICN PDN connection to the UE 16. It is noted that the message sent is not necessarily a new message, but an already existing (authentication) message to which the IE defining ICN is piggybacked.

It is further noted that in case the network uses an LGW 24 (which even may be collocated with the eNodeB 11), the eNodeB 11 may select the LGW 24. In that case, an identification of the selected LGW 24 (e.g. its IP address) is sent to the MME 13 in step S1.

Thereafter, in S3, the MME 13 submits a Create Session Request to the SGW 12, indicating that a gateway supporting ICN (in this case the LGW 24) has been selected for setting up the ICN PDN connection as indicated in the Attach Request initially submitted in step S1. Hence, the Create Session Request of S3 to the SGW 12 will contain the address of the LGW 24. Alternatively, the eNodeB 11 selects the LGW 24 and informs the MME 13 accordingly in step S1. Either way, the MME 13 will inform the SGW 12 about the selection in step S3

In step S4, the Create Session Request is thus sent from the SGW 12 to the LGW 24, which responds with a Create Session Response in step S5, and the SGW 12 in its turn responds by submitting the Create Session Response in step S6 to the MME 13.

As a final step of establishing the ICN PDN connection with the PDN-type ICN network 23, the MME 13 sends, via the eNodeB 11, an Attach Accept message to the UE 16 in step S7, which responds with an Attach Complete message in step S8.

Advantageously, a PDN connection has been established between the UE 16 and the ICN network 23 with the LGW 24 serving as an ICN network gateway.

As was discussed with reference to FIG. 5, scenarios can be envisaged where it is advantageous that information identifying at least one ICN node (not shown in FIG. 6) of the ICN network 23, with which the PDN connection is established for transporting ICN data, is acquired. Such information may be provided to the UE 16 with the Attach Accept message in step S7.

Figure 7:
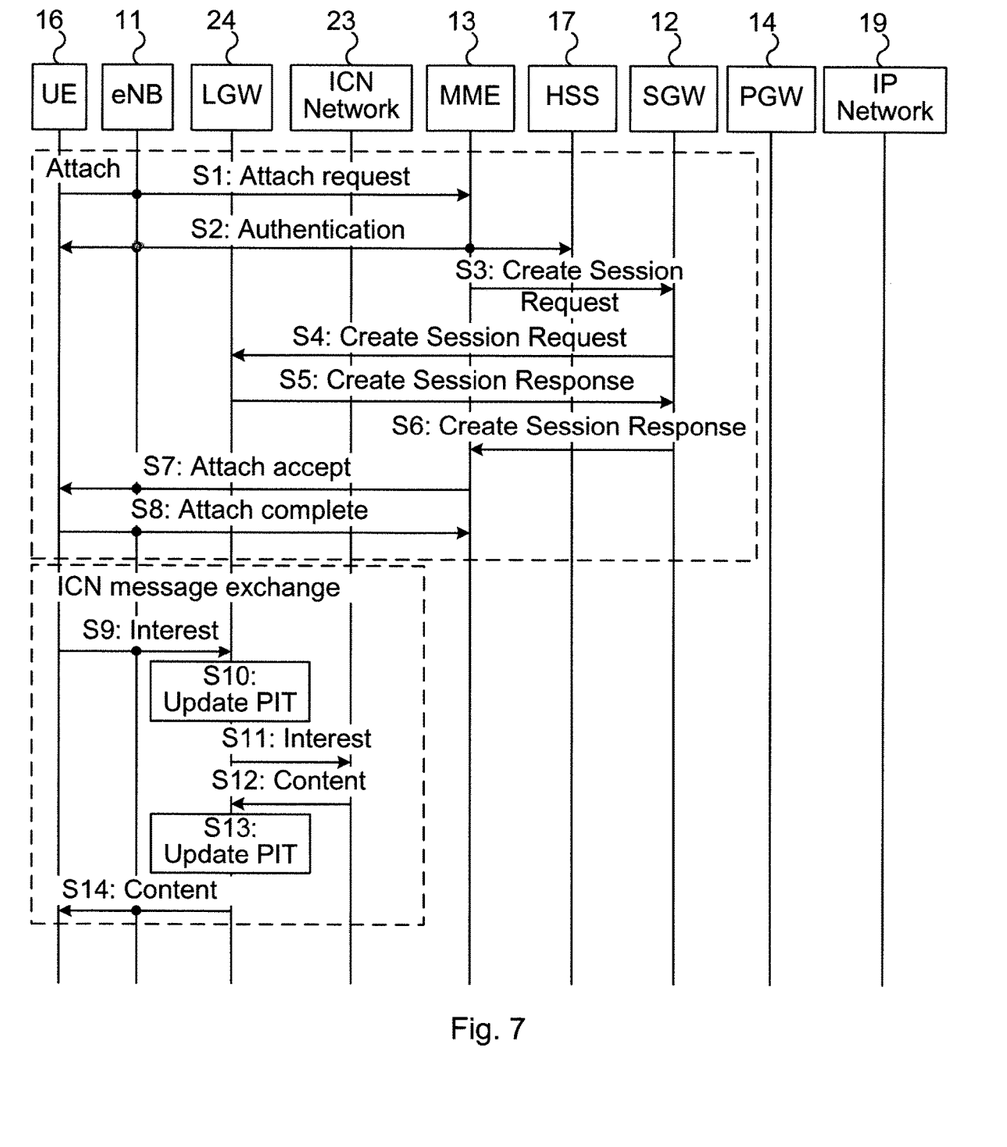
FIG. 7 further illustrates a sequence diagram according to an embodiment, where exchange of ICN messages between the UE and an ICN network is performed.

FIG. 7 further illustrates exchange of ICN messages between the UE 16 and the ICN network 23 in an embodiment, and delivery of requested ICN content. Hence, after the ICN PDN connection to the ICN network 23 has been setup, the UE 16 sends an interest via the eNodeB 11 to the ICN network 23 (i.e. in practice to an ICN node in the ICN network) in step S9, thereby requesting ICN content.

As previously discussed, any node routing interests to an ICN network keeps a record of the interest messages it has forwarded (i.e. where the interest message came from and what Content Object it was naming) in their Pending Interest Table (PIT). As a consequence, the LGW 24 updates in step S10 its PIT in the light of the interest that just was received from the UE 16.

In step S11, the interest is forwarded to one or more ICN nodes (not shown) in the ICN network 23, which in their turn may forward the interest to further ICN nodes until the requested content is found. Subsequently, in step S12, the ICN network 23 submits the requested content to the LGW 24, which again updates the PIT in step S13, and forwards the requested content to the UE 16 via the eNodeB 11 in step S14.

Figure 8:
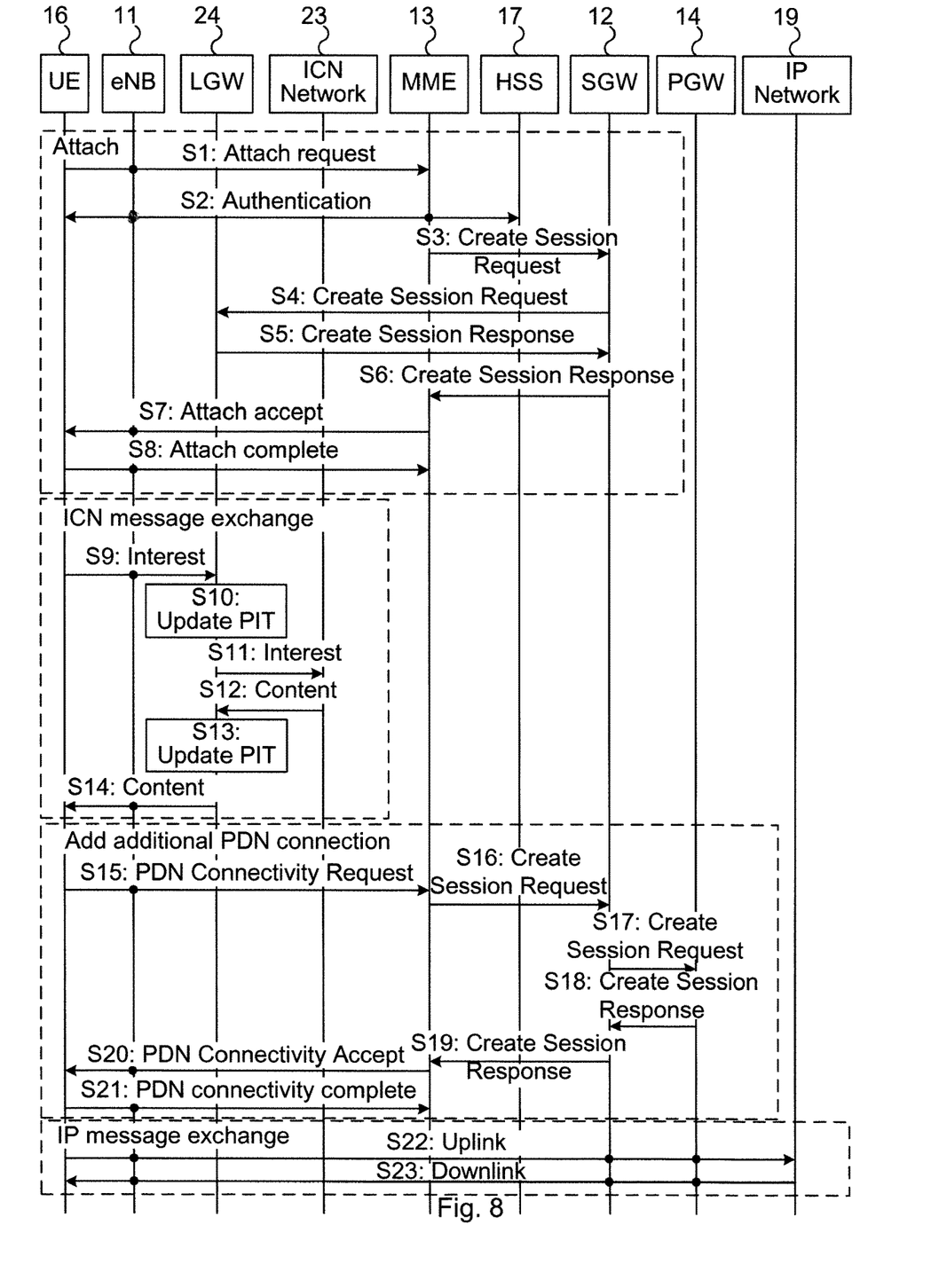
FIG. 8 illustrates the setting up of a further PDN connection after an ICN PDN connection has been established.

FIG. 8 illustrates the setting up of a further PDN connection after the ICN PDN connection has been established (described for instance in FIG. 5.10.2-1 of 3GPP TS 23.401).

In step S15, the UE 16 initiates establishment of a PDN connection with the network 10 by submitting a PDN Connectivity Request to the MME 13 via the eNodeB 11. This request comprises a PDN type identifier (e.g. IPv4, IPv4v6, IPv6, etc.).

In step S16, the MME 13 submits a Create Session Request to the SGW 12, indicating which PGW 14 is selected, and the SGW in its turn sends the Create Session Request in step S17 to the selected PGW 14. The PGW 14 responds with a Create Session Response in step S18, and the SGW 12 further sends the Create Session Response to the MME 13 in step S19.

As a final step of establishing the PDN connection with the PDN-type IP network 19 (commonly being the Internet), the MME 13 sends, via the eNodeB 11, a PDN Connectivity Accept message to the UE 16 in step S20, which responds with an PDN Connectivity Complete message in step S21.

The UE 16 may thus, via the eNodeB 11, the SGW 12 and the PGW 14, exchange IP data with the IP PDN network 19 in the uplink in step S22, and in the downlink in step S23, over the PDN connection set up through steps S15-S21.

It should be noted that the two PDN connections established in FIG. 8 may be set up in the reverse order; that is, the IP PDN connection 20 is established in an initial attach process, while the ICN PDN connection 21 is established in an additional PDN connectivity process. In such an embodiment, the PDN Connectivity Request from the UE 16 in step S15 will comprise the IE indicating that the request pertains to establishing a PDN connection for transporting ICN data between the UE 16 and the ICN network 23. Again, the request for setting up an ICN PDN connection is advantageously distinguished from a regular PDN connection request (which conversely would be initiated in step S1).

Figure 9:
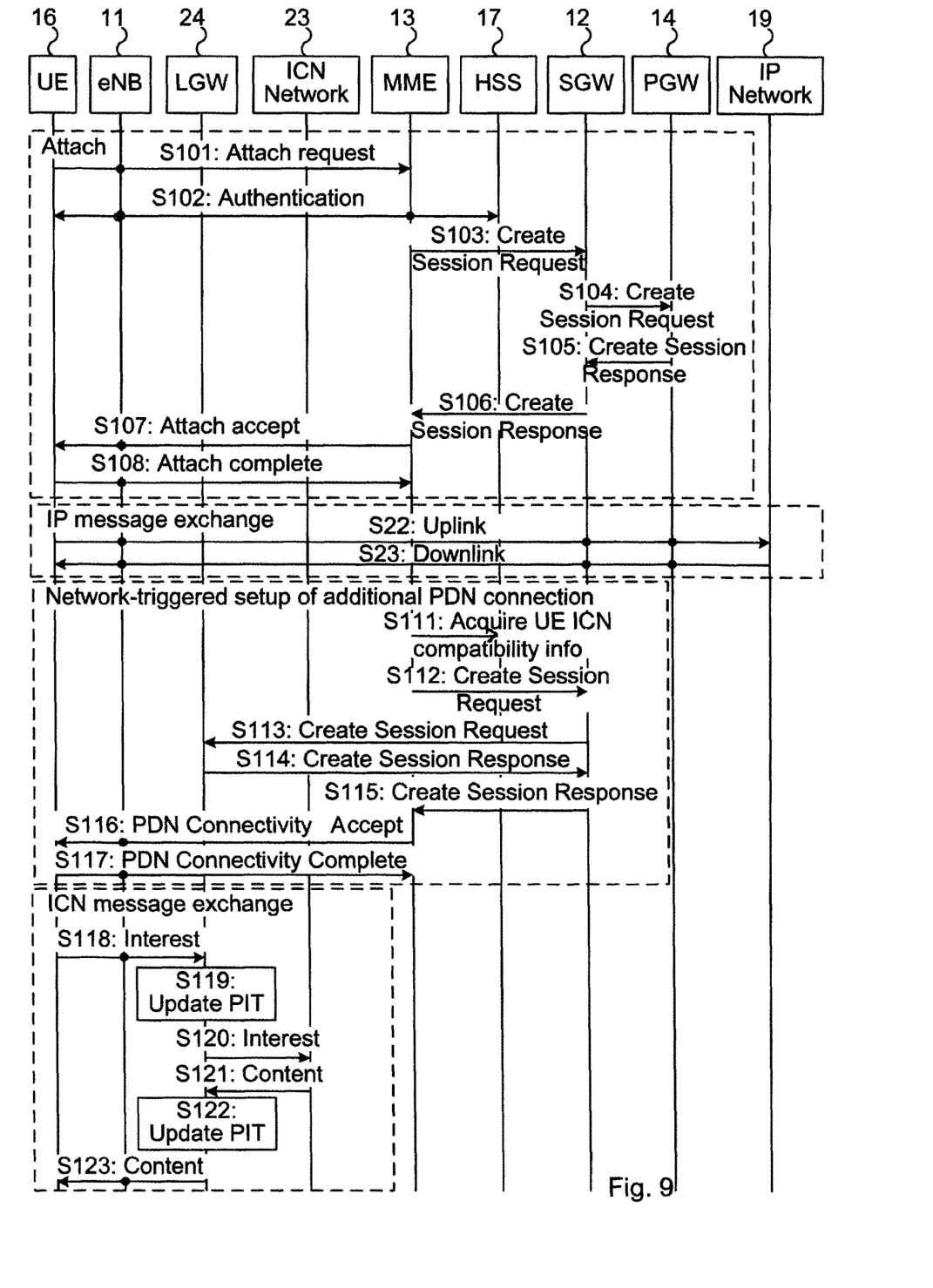
FIG. 9 illustrates a sequence diagram according of an embodiment where the network initiates the establishment of the ICN PDN connection with the UE.

FIG. 9 illustrates a sequence diagram according of an embodiment where the order of establishing the IP PDN connection and the ICN PDN connection is reversed. In this embodiment, it is further shown that the network 10 advantageously is capable of initiating the establishment of the ICN PDN connection with the UE 16.

In step S101, the UE 16 initiates establishment of a PDN connection with the network 10 by submitting an Attach Request to the MME 13 via the eNodeB 11, which Attach Request indicates that the requested PDN connection for instance is of the type IPv4, IPv4v6 or IPv6.

Upon receiving the Attach Request, the MME 13 optionally performs an authentication procedure S102 with the UE 16 and the HSS 17, for instance by verifying that an IMSI of the UE 16 is registered with the HSS 17.

Thereafter, in S103, the MME 13 submits a Create Session Request to the SGW 12, indicating that a gateway supporting IP traffic is to be selected for setting up the IP PDN connection as indicated in the Attach Request initially submitted in step S1. Hence, the Create Session Request of S103 to the SGW 12 may contain the address of the PGW 19.

In step S104, the Create Session Request is thus sent from the SGW 12 to the PGW 19, which responds with a Create Session Response in step S105. The SGW 12 further submits the Create Session Response in step S106 to the MME 13, which contains information such as the address to the IP PDN 19.

As a final step of establishing the IP PDN connection with the PDN network 19, the MME 13 sends, via the eNodeB 11, an Attach Accept message to the UE 16 in step S107, which responds with an Attach Complete message in step S108.

The UE 16 may thus, via the eNodeB 11, the SGW 12 and the PGW 19, exchange IP data with the IP PDN network 19 in the uplink in step S109, and in the downlink in step S110, over the PDN connection set up through steps S101-S108.

In this embodiment, the MME 13 triggers the establishment of an ICN PDN connection with the UE 16. It may be envisaged that that the MME 13 acquires information e.g. from stored subscription data received from the UE 16 or the HSS 17 in step S111 as to whether the UE 16 is ICN compatible.

Network-initiated PDN connection could be used e.g. in deployment scenarios where the LGW serving as an ICN gateway 24 is collocated with or close to the eNodeB 11, and therefore maybe not available everywhere. This may lead to situations where network ICN support comes and goes along with the UE 16 moving. In such scenario, the network 10 may initiate to setup or re-setup the ICN PDN connection once the UE 16 is in an area where the network supports ICN.

The UE 16 may thus acquire information that ICN again is supported, e.g. in a handover command or from reading system information in a target cell. As has been described up until now, the UE 16 could thus initiate establishment of the ICN PDN connection.

However, in this embodiment, the MME 13 will trigger the establishment of the ICN PDN connectivity with the UE 16 upon acquiring information in step S111 that the UE 16 indeed is capable of handling ICN data.

In step S112, the MME 13 initiates establishment of a PDN connection by submitting a Create Session Request to the SGW 12 indicating the selected LGW 24. Hence, with the submitted Create Session Request, an ICN gateway in the communication network is selected via which the ICN data subsequently should be transported between the UE 16 and the ICN PDN 23.

The SGW 12 accordingly sends the Create Session Request to the selected ICN gateway—i.e. the LGW 24—in step S113. The LGW 24 responds with a Create Session Response in step S114, and the SGW 12 further sends the Create Session Response to the MME 13 in step S115.

As a final step of establishing the PDN connection with the PDN-type ICN network 23, the MME 13 sends, via the eNodeB 11, a PDN Connectivity Accept message to the UE 16 in step S116. Optionally, this message could indicate an ID of the LGW 24 used for the PDN connection. The UE 16 responds with a PDN Connectivity Complete message in step S117.

Advantageously, a PDN connection has been established between the UE 16 and the ICN network 23 with the LGW 24 serving as an ICN network gateway.

FIG. 9 further illustrates exchange of ICN messages between the UE 16 and the ICN network 23, and delivery of requested ICN content. Hence, after the ICN PDN connection to the ICN network 23 has been setup throughout steps S111-S117, the UE 16 sends an interest via the eNodeB 11 to the ICN network 23 (i.e. in practice to an ICN node in the ICN network) in step S118, thereby requesting ICN content.

As previously discussed, any node routing interests to an ICN network keeps a record of the interest messages is has forwarded (i.e. where it came from and what Content Object it was naming) in their PIT. As a consequence, the LGW 24 updates in step S119 its PIT in the light of the interest that just was received from the UE 16.

In step S120, the interest is forwarded to an ICN node in the ICN network 23, which in its turn may forward the interest to further ICN nodes until the requested content is found. Subsequently, in step S121, the ICN network 23 submits the requested content to the LGW 24, which again updates the PIT in step S122, and forwards the requested content to the UE 16 via the eNodeB 11 in step S123.

With embodiments described, by distinguishing ICN traffic from non-ICN traffic, prioritization of ICN traffic over other traffic in terms of e.g. QoS may be envisaged. The prioritization can be based on operator policies e.g. provided in the PCRF 15 or HSS 17. The can be based on the existing QoS concepts defined for 3GPP systems, or using special information about which traffic is ICN traffic. The latter case may require an indication sent from the UE or network node to the RAN about which traffic is ICN traffic, e.g. in the case the ICN node is located in a separate node. Such an indication from the UE could be provided in e.g. an RRC Connection Reconfiguration Complete message, wherein the indication would be associated with a bearer (Data Radio Bearer), whose establishment is acknowledged. If the indication is provided by the network node, it could be included in the Initial Context Setup Request message, an E-RAB ("E-UTRAN Radio Access Bearer") Setup Request or an E-RAB Modify Request S1AP message. Also such a network node—provided indication would be associated with a bearer belonging to a PDN connection.

Figure 10:
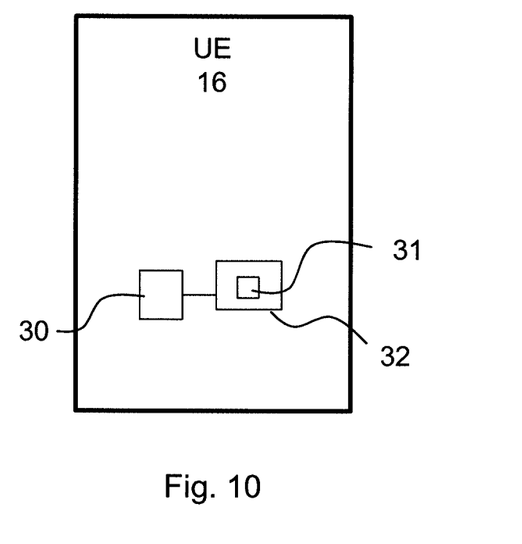
FIG. 10 illustrates a wireless communication device according to an embodiment.
Figure 11:
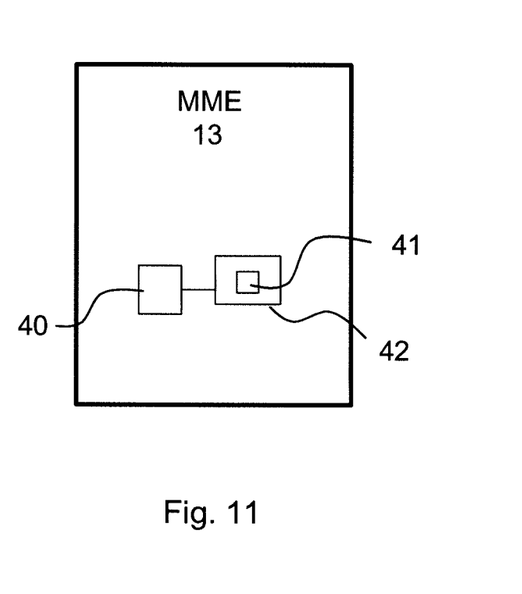
FIG. 11 illustrates a network node according to an embodiment.

With reference to FIGS. 10 and 11, the steps of the method performed by the UE 16 and the network node 13, respectively (being e.g. the eNodeB 11 or the MME 13), according to embodiments are in practice performed by a processing unit 30, 40 embodied in the form of one or more microprocessors arranged to execute a computer program 31, 41 downloaded to a suitable storage medium 32, 42 associated with the microprocessor, such as a Random Access Memory (RAM), a Flash memory or a hard disk drive. The respective processing unit 30, 40 is arranged to cause the UE 16 and the MME 13 to carry out the method according to embodiments when the appropriate computer program 30, 40 comprising computer-executable instructions is downloaded to the storage medium 32, 42 and executed by the processing unit 30, 40. The storage medium 32, 42 may also be a computer program product comprising the computer program 31, 41. Alternatively, the computer program 31, 41 may be transferred to the storage medium 32, 42 by means of a suitable computer program product, such as a Digital Versatile Disc (DVD) or a memory stick. As a further alternative, the computer program 31, 41 may be downloaded to the storage medium 32, 42 over a network. The processing unit 30, 40 may alternatively be embodied in the form of a digital signal processor (DSP), an application specific integrated circuit (ASIC), a field-programmable gate array (FPGA), a complex programmable logic device (CPLD), etc.

Figure 12:
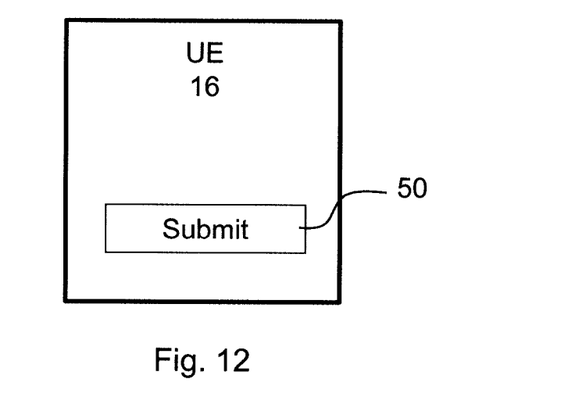
FIG. 12 illustrates a wireless communication device according to another embodiment.

FIG. 12 illustrates a wireless communication device in the form of a UE 16 configured to enable establishment of at least one PDN connection with a communication network according to an embodiment.

The UE 13 comprises submitting means 50 adapted to submit, to a node of the communication network, a request to establish the PDN connection, the request being configured to comprise an indication that the request pertains to establishing a PDN connection for transporting ICN data.

The submitting means 50 may comprise a communications interface for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 13:
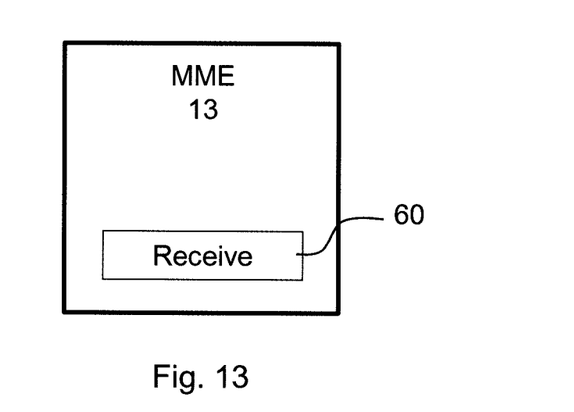
FIG. 13 illustrates a network node according to another embodiment.

FIG. 13 illustrates a network node 13 in the form of an MME configured to enable establishment of at least one PDN connection with a wireless communication device in a communication network according to an embodiment.

The MME 13 comprises receiving means 60 adapted to receive, from the wireless communication device, a request to establish the PDN connection, the request being configured to comprise an indication that the request pertains to establishing a PDN connection for ICN data.

The receiving means 60 may comprise a communications interface for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 14:
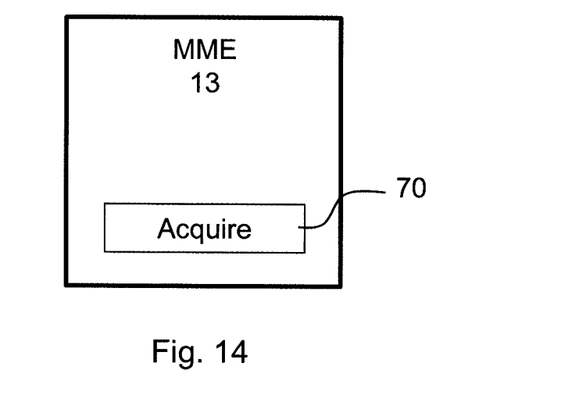
FIG. 14 illustrates a network node according to yet another embodiment.

FIG. 14 illustrates a network node 13 in the form of an MME configured to enable establishment of at least one PDN connection with a wireless communication device in a communication network according to another embodiment.

The MME 13 comprises acquiring means 70 adapted to acquire an indication whether the wireless communication device is capable of establishing a PDN connection for transporting ICN data.

The acquiring means 70 may comprise a communications interface for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a wireless communication device of enabling establishment of a Packet Data Network ("PDN") connection with a communication network, the method comprising:
   transmitting, to a network node of the communication network, a request to establish a PDN connection, the request including an indication that the request pertains to establishing a PDN connection for transporting Information Centric Networking ("ICN") data and an indication of an ICN gateway node in the communication network with which the PDN connection is to be established;
   responsive to transmitting the request, receiving a response message from the network node; and
   responsive to receiving the response message, communicating the ICN data over the PDN connection via the ICN gateway node.

2. The method of claim 1, further comprising:
   determining that the communication network is capable of establishing the PDN connection for transporting the ICN data.

3. The method of claim 2, wherein determining that the communication network is capable of establishing the PDN connection comprises:
   receiving, from the network node, an indication that the communication network is capable of establishing the PDN connection for transporting the ICN data.

4. The method of claim 2, wherein determining that the communication network is capable of establishing the PDN connection comprises:
   receiving, from a Subscriber Identity Module ("SIM") of the wireless communication device, an indication that the communication network is capable of establishing the PDN connection for transporting the ICN data.

5. The method of claim 1, further comprising:
   receiving information identifying at least one ICN node with which the PDN connection is established for transporting the ICN data.

6. The method of claim 1, wherein-receiving the response message comprises receiving an indication of the ICN gateway node in the communication network,
   wherein the PDN connection for transporting the ICN data is established with the ICN gateway node.

7. A wireless communication device configured to enable establishment of a Packet Data Network ("PDN") connection with a communication network, the wireless communication device comprising:
   processing circuitry; and
   memory coupled to the processing circuitry and having instructions stored therein that are executable by the processing circuitry to cause the wireless communication device to perform operations, the operations comprising:
      transmitting, to a network node of the communication network, a request to establish a PDN connection, the request including an indication that the request pertains to establishing a PDN connection for transporting Information Centric Networking ("ICN")

data and an indication of an ICN gateway node in the communication network with which the PDN connection is to be established;

responsive to transmitting the request, receiving a response message from the network node; and responsive to receiving the response message, communicating the ICN data over the PDN connection via the ICN gateway node.

8. The wireless communication device of claim 7, the operations further comprising:

determining that the communication network is capable of establishing the PDN connection for transporting the ICN data.

9. The wireless communication device of claim 8, wherein determining that the communication network is capable of establishing the PDN connection comprises:

receiving, from the network node, an indication that the communication network is capable of establishing the PDN connection for transporting the ICN data.

10. The wireless communication device of claim 8, wherein determining that the communication network is capable of establishing the PDN connection comprises:

receiving, from a Subscriber Identity Module ("SIM") of the wireless communication device, an indication that the communication network is capable of establishing the PDN connection for transporting the ICN data.

11. The wireless communication device of claim 7, the operations further comprising:

receiving, information identifying at least one ICN node with which the PDN connection is established for transporting the ICN data.

12. The wireless communication device of claim 7, wherein receiving the response comprises receiving an indication of the ICN gateway node in the communication network, wherein the PDN connection for transporting the ICN data is established with the ICN gateway node.

13. A non-transitory computer readable medium having instructions stored therein that are executable by processing circuitry of a wireless communication device to cause the wireless communication device to perform operations comprising:

transmitting, to a network node of a communication network, a request to establish a PDN connection, the request including an indication that the request pertains to establishing the PDN connection for transporting Information Centric Networking ("ICN") data and an indication of an ICN gateway node in the communication network with which the PDN connection is to be established;

responsive to transmitting the request, receiving a response message from the network node; and responsive to receiving the response message, communicating the ICN data over the PDN connection via the ICN gateway node.

14. The non-transitory computer-readable medium of claim 13, the operations further comprising:

receiving, from the network node, an indication that the communication network is capable of establishing the PDN connection for transporting the ICN data.

15. The non-transitory computer-readable medium of claim 13, the operations further-comprising:

receiving, from a Subscriber Identity Module ("SIM") of the wireless communication device, an indication that the communication network is capable of establishing the PDN connection for transporting the ICN data.

16. The non-transitory computer-readable medium of claim 13, the operations further comprising:

receiving information identifying at least one ICN node with which the PDN connection is established for transporting the ICN data.

17. The non-transitory computer-readable medium of claim 13, wherein receiving the request message comprises receiving an indication of the ICN gateway node in the communication network, wherein the PDN connection for transporting the ICN data is established with the ICN gateway node.

* * * * *